(12) United States Patent
Nakayama

(10) Patent No.: US 8,240,720 B2
(45) Date of Patent: Aug. 14, 2012

(54) PACKING

(75) Inventor: Kenich Nakayama, Tokyo (JP)

(73) Assignee: Lead Engineering Co., Ltd., Tokyo (JP)

( * ) Notice: Subject to any disclaimer, the term of this patent is extended or adjusted under 35 U.S.C. 154(b) by 197 days.

(21) Appl. No.: 12/656,391

(22) Filed: Jan. 28, 2010

(65) Prior Publication Data

US 2011/0133446 A1 Jun. 9, 2011

(30) Foreign Application Priority Data

Dec. 9, 2009 (JP) .................................. 2009-279073

(51) Int. Cl.
*F16L 17/00* (2006.01)
(52) U.S. Cl. .......... 285/370; 285/18; 285/105; 285/108; 285/417; 277/337; 277/608; 277/616
(58) Field of Classification Search .................. 285/223, 285/231–232, 236, 419, 18, 86, 104–105, 285/108–109, 370–371, 417; 277/329, 337–338, 277/608–609, 616
See application file for complete search history.

(56) References Cited

U.S. PATENT DOCUMENTS

| | | | | | |
|---|---|---|---|---|---|
| 2,218,835 | A | * | 10/1940 | Ulrich ........................... | 285/109 |
| 2,261,566 | A | * | 11/1941 | Russell et al. ................. | 285/397 |
| 2,828,979 | A | * | 4/1958 | Wiltse ........................... | 285/109 |
| 3,269,754 | A | * | 8/1966 | Bertling et al. ................ | 285/109 |
| 3,521,913 | A | * | 7/1970 | Verhein et al. ................ | 285/109 |
| 4,269,437 | A | * | 5/1981 | Shaw et al. .................... | 285/109 |

FOREIGN PATENT DOCUMENTS

JP 6-6260 Y2 2/1994

* cited by examiner

*Primary Examiner* — Aaron Dunwoody
*Assistant Examiner* — Fannie Kee
(74) *Attorney, Agent, or Firm* — Rader, Fishman & Grauer PLLC

(57) ABSTRACT

A packing, interposed between respective ends of electric wire tubes serving as tubular members opposed to each other, includes a main body and an elastic member. The main body is inserted through inner-diameter-openings of the respective ends of the electric wire tubes, respectively. The elastic member is situated substantially at a center of the main body and the respective ends of the electric wire tubes are abutted against the elastic member. The electric wire tubes joined with each other through the packing are inserted into the body constituting the coupling. Then, grip portions of the body are forced into a grip case. The body is thereby decreased in diameter, and hence the electric wire tubes are fastened in a biting manner by the body.

3 Claims, 4 Drawing Sheets

PACKING

BACKGROUND OF THE INVENTION

1. Field of the Invention

The present invention relates to a packing used for joining end portions of electrical wire tubes with each other, which protect electric wires and so on, and to a coupling using the packing.

2. Description of the Related Art

A "screwless coupling", which has been disclosed in Japanese Utility Model Application Laid-open No. Hei 06-6260, refers to a water-proof type coupling used for coupling electrical wire tubes with each other, which is used as a power distribution installation in nuclear power facilities and the like.

Such "screwless coupling" includes a metal body and a grip case, which is engaged with a grip portion of the body. A water-proof packing is arranged within the body.

The water-proof packing is engaged with a center stopper protruding from an inner peripheral surface of the body, and an outer peripheral surface of the water-proof packing is adhesively fixed to the inner peripheral surface of the body with a water-resistant adhesive. Further, in the "screwless coupling", an arc-like closing plate is needed to close an opening of the body.

However, in such screwless coupling, there is a problem in that it is troublesome to adhesively fix the water-proof packing to the inner peripheral surface of the body.

Further, a high degree of skill is required to adhesively fix the water-proof packing to an accurate position of the inner peripheral surface of the body.

In addition, the arc-like closing plate is needed, and hence a procedure for the screwless coupling becomes more troublesome.

SUMMARY OF THE INVENTION

Therefore, the present invention has been made to provide a packing used for a screwless coupling used for coupling two tubes such as electrical wire tubes to be coupled with each other, the packing being capable of ensuring water-proof performance and making fitting of the packing as easy as possible.

According to the present invention, there is provided a packing interposed between respective ends of tubular members opposed to each other, including: a main body inserted into the tubular members through an inner-diameter-opening of each of the respective ends of the tubular members; and an elastic portion which is situated substantially at a center of the main body, and against which each of the respective ends of the tubular members is abutted, in which: the main body includes: outer peripheral surfaces coming into contact with inner diameter surfaces of the tubular members, respectively; tapered surfaces tapered toward tip ends of the outer peripheral surfaces; recessed portions defined by steps forming the tapered surfaces and the outer peripheral surfaces; and a convex portion formed between the recessed portions; and the elastic portion includes: an enclosing portion enclosing the convex portion of the main body; and extending portions which extend from the enclosing portion, and has tip ends fitting into the recessed portions of the main body, respectively.

The enclosing portion of the elastic portion is formed of a rigid material; and the extending portions of the elastic portion are formed of a soft material.

As the coupling for coupling the tubular members with each other, the following "screwless coupling" is preferred.

Specifically, there is provided the screw less coupling including: a tubular metal body provided with an slit-like aperture extending over entire length of the tubular metal body in parallel to axis line thereof and provided with a pair of grip portions formed by bending edge-portions on both sides of the aperture to an outer peripheral side; a grip case engaged with the pair of grip portions so that a radius of the body is reduced; and a plurality of lock pins protruding to an inner peripheral surface of the body so that a cutting-edge-portion of each of the plurality of lock pins, which is fit into a mounting hole passing through the body to both sides thereof in a radial direction, bite in an outer periphery of each of the tubular members, in which: the mounting hole includes: an equal-diameter hole portion; and a conical hole portion, which is continuous with a side of an inner periphery of the equal-diameter hole portion and increases in diameter toward an inner peripheral surface of the body; each of the plurality of lock pins includes: a cylindrical portion fitting into the equal-diameter hole portion; and a circular-truncated-cone-like portion which is continuous with the cylindrical portion, is fit into the conical hole portion, and increases in diameter toward a side of the inner periphery of the body; the circular-truncated-cone-like portion is continuous with each of the cutting-edge-portion through intermediation of a stage provided to a large-diameter end of the circular-truncated-cone-like portion; and the stage of each of the plurality of lock pins is engaged with an engaging portion formed by being raised from the inner peripheral portion of the body by punching while the cylindrical portion and the circular-truncated-cone-like portion of each of the plurality of lock pins being fit into the equal-diameter hole portion and the conical hole portion of the mounting hole, respectively, to thereby fix each of the plurality of lock pins to the body.

It is sufficient that the main body is inserted into the inner-diameter-opening of each of the respective ends of the tubular members, and hence it is possible to save effort for fitting of the packing and to make fitting of the packing as easy as possible.

Each of the respective ends of the tubular members is made water-proof due to the elastic portion of the packing, and the inner diameter surface of each of the tubular members is made water-proof due to the main body of the packing. Thus, the water-proof function is exerted.

Therefore, as the coupling for connecting the electric wire tubes with each other, not a "screw less coupling" of a water-proof type but the above-mentioned coupling of a typical type can be used.

DETAILED DESCRIPTION OF THE PREFERRED EMBODIMENTS

Figure 1:
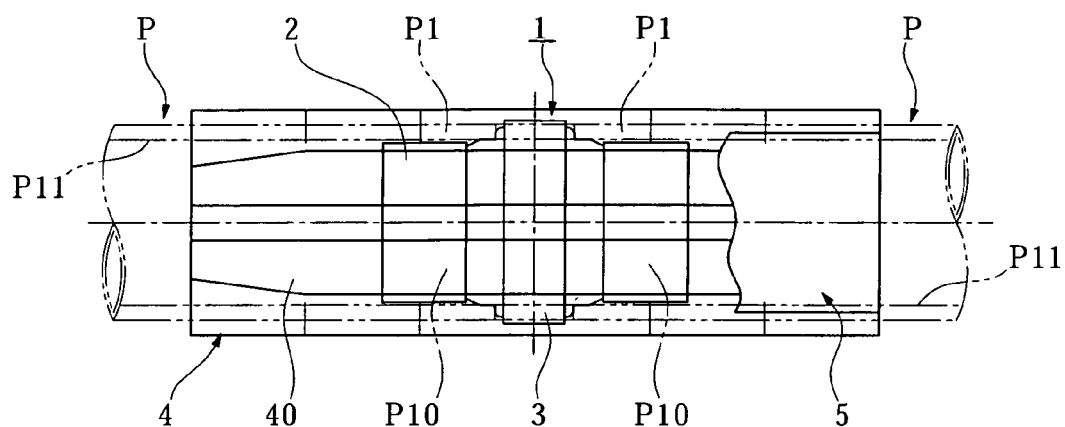
FIG. 1 is a cross-sectional view of main parts of a fitting structure of electrical wire tubes in a state in which a packing is installed in the electrical wire tubes.
Figure 2:
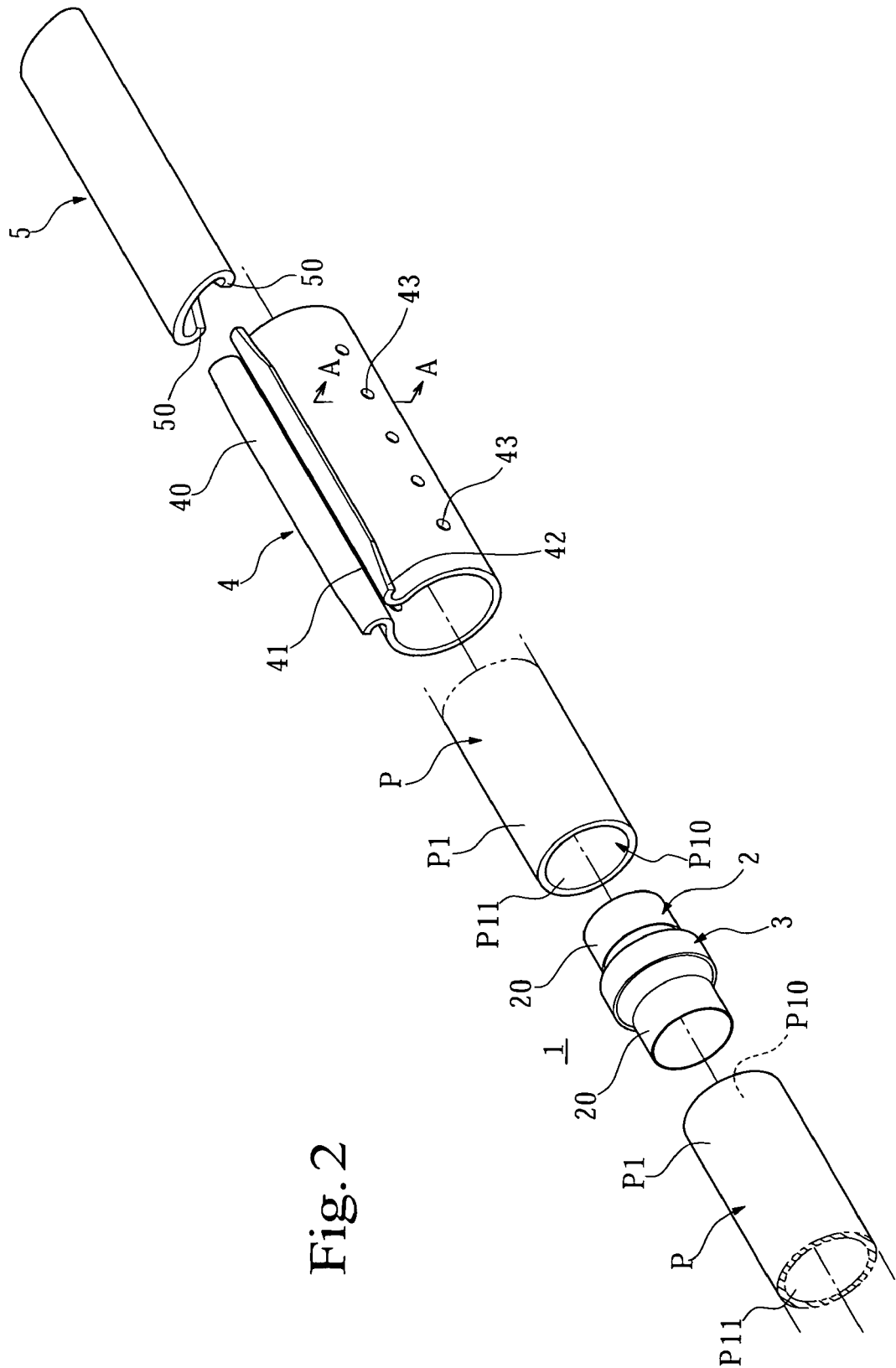
FIG. 2 is an exploded perspective view of the fitting structure of the electric wire tubes of FIG. 1.

A packing 1 according to the invention of this application is, as illustrated in FIGS. 1 and 2, interposed between respective ends P1 and P1 of electric wire tubes P and P as tubular members opposed to each other. The packing 1 includes a main body 2 and an elastic member 3. Both ends of the main body 2 are inserted into inner-diameter-openings P10 and P10 of the respective ends P1 and P1 of the electric wire tubes P and P, respectively. The elastic member 3 is situated substantially at a center of the main body 2, and the respective ends P1 and P1 of the electric wire tubes P and P are abutted against the elastic member 3.

The electric wire tubes P and P joined with each other through the packing 1 are inserted into a body 4 constituting the coupling. Then, grip portions 40 of the body 4 are engaged with a grip case 5. The body 4 is decreased in diameter, and hence the electric wire tubes P and P are fastened in a biting manner by the body 4.

Figure 3:
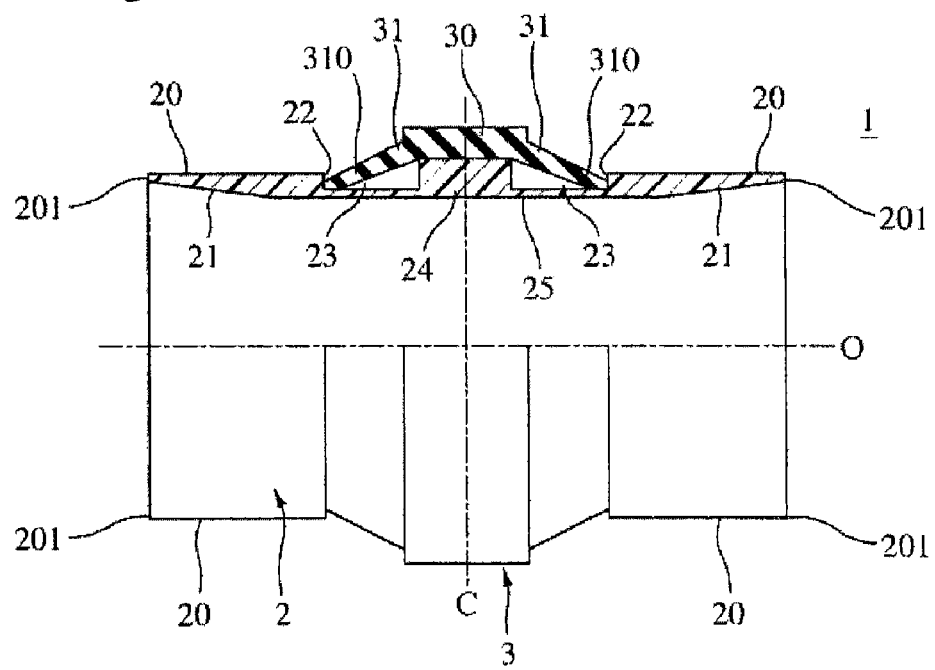
FIG. 3 is a view of the packing of FIG. 1, in which a half of the packing is illustrated in a cross-sectional view.

The main body 2 of the packing 1 includes outer peripheral surfaces 20 and 20 (hereinafter, see FIG. 3), tapered surfaces 21 and 21, recessed portions 23 and 23, and a convex portion and/or protrusion 24. The outer peripheral surfaces 20 and 20 come into contact with inner diameter surfaces P11 and P11 of the electric wire tubes P and P, respectively. The tapered surfaces 21 and 21 are tapered toward tip ends 201 and 201 of the outer peripheral surfaces 20 and 20. One-side ends of the recessed portions 23 and 23 are determined by steps 22 and 22 for forming the tapered surfaces 21 and 21 and the outer peripheral surfaces 20 and 20. The convex portion 24 is formed between the recessed portions 23 and 23 and is formed in an outer periphery of a center C intersecting a center line O of the body 2.

The outer peripheral surfaces 20 and 20 exert a water-proof function by coming into contact with inner diameter surfaces P11 and P11 of the electric wire tubes P and P, respectively.

The tapered surface 21 allows, when electrical wire (not shown) is inserted into the electric wire tube P, the electrical wire to be smoothly inserted without damaging the inserted electrical wire. Note that, a continuous surface 25 continuous with the tapered surfaces 21 and 21 on the right side and left side protects the elastic member 3 from the electrical wire.

The recessed portions 23 formed by the steps 22 determine spaces for receiving therein extending portions 31 of the elastic member 3 which is pressed by the respective ends P1 and P1 of the electric wire tubes P and P (which is described later). For this purpose, a capacity of the recessed portion 23 is equal to a volume of the extending portion 31.

The convex portion 24 is shaped in such a manner that a height of the convex portion 24 from the continuous surface 25 is higher than a height of the step 22 from the continuous surface 25. With this structure, the one end P1 of the electric wire tube P does not advance over the convex portion 24, and is abutted against the convex portion 24.

The elastic member 3 of the packing 1 includes an enclosing portion 30 and the extending portions 31 and 31. The enclosing portion 30 encloses the outer side of the convex portion 24 of the main body 2. The extending portions 31 and 31 extend from the both sides of the enclosing portion 30, and tip ends 310 and 310 of the extending portions 31 and 31 are fitted into the recessed portions 23 and 23 of the main body 2, respectively.

The enclosing portion 30 has a ring shape and is mounted on the convex portion 24. A cross-section of the enclosing portion 30 has a substantially rectangular shape, which is formed to have a larger width than a width of the convex portion 24 of the main body 2.

The tip ends 310 and 310 of the extending portions 31 and 31 extend from the both sides of the enclosing portion 30 toward the lower side so as to form a substantially inverted-V-shape. The tip ends 310 and 310 of the extending portions 31 and 31 may be received in the recessed portions 23 and 23 of the main body 2, respectively.

The main body 2 of the packing 1 is formed of plastic such as polyacetal. The elastic portion 3 is formed of rubber such as chloroprene, for example. For example, the enclosing portion 30 made of a rigid material and the extending portion 31 made of a soft material may be integrally formed.

Action of the packing formed as described above are described with reference to FIG. 4.

Figure 4:
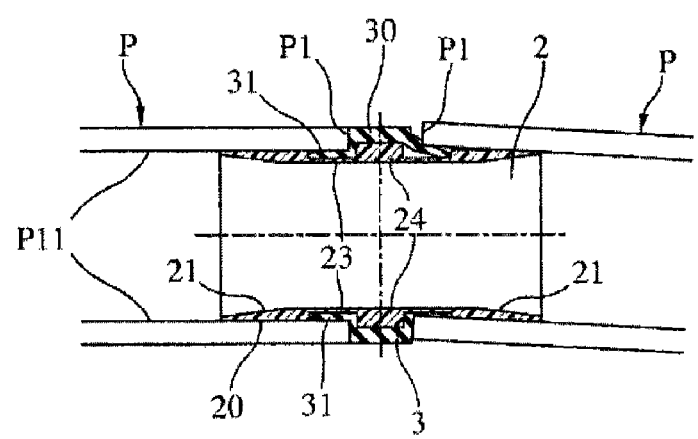
FIG. 4 is a view of the packing of FIG. 1, which illustrates action of the packing.

In FIG. 4, the one end P1 of the electric wire tube P on the left side of the drawing is abutted against a side surface of the convex portion 24 of the main body 2 of the packing through intermediation of the enclosing portion 30 of the elastic portion 3 of the packing. The extending portion 31 is forced into the recessed portion 23 of the main body 2.

Meanwhile, the electric wire tube P on the right side of the drawing is slightly tilted depending on an arranging condition. In FIG. 4, one end P1 of the upper portion (in the drawing) of the electric wire tube P is abutted against the extending portion 31 through intermediation of the enclosing portion 30 of the elastic member 3 of the packing. The one end P1 of the lower portion (in the drawing) of the electric wire tube P forces the extending portion 31 into the recessed portion 23 of the main body 2, and is caused to penetrate into the recessed portion 23 of the main body 2.

Note that, the joining structure as described above, in which the electric wire tube P on the right side of the drawing is slightly tilted depending on the arranging condition, may be also assumed in a case where the one end P1 of the electric wire tube P is not perpendicular to the center axis thereof, that is, the one end P1 of the electric wire tube P is obliquely cut.

The effect of the packing 1 having the above-mentioned structure and action is as follows:

(1) the one end P1 of the electric wire tube P is received by the enclosing portion 30 and the tapered extending portion 31 of the elastic portion 3, and hence the water-proof function is exerted, and the function accommodates also the case where the one end P1 of the electric wire tube P is tilted with respect to the center axis thereof;

(2) the inner diameter surface P11 of the electric wire tube P is held in close contact with the outer peripheral surface 20 of the main body 2, and hence the water-proof function is exerted;

(3) the water-proof function is exerted only by inserting the main body 2 of the packing 1 into both ends of the electric wire tubes P and P, and hence effort for fitting of the packing is reduced;

(4) even when an external force acts on the one end P1 of the electric wire tube P, the one end P1 is restricted from moving so as not to be offset from its center due to the presence of the convex portion 24, and hence water-proof performance is exerted.

(5) the both opposed ends of the electric wire tubes P and P are separately restricted by the convex portion 24, respectively so that the both opposed ends do not influence on each other, and hence the water-proof function is exerted.

(6) the tapered surfaces 21 and 21 of the main body 2 of the packing allows the electrical wires to be smoothly wired; and (7) further, as the coupling for connecting the electric wire tubes with each other through the above-mentioned packing 1, not a "screw less coupling" of a water-proof type but a "screw less coupling" of a typical type can be used, and hence it is possible to prevent moisture or fresh concrete from flowing into the electric wire tube even when the "screw less coupling" of the typical type is embedded in a wall surface of a building and so on.

As described above, the water-proof performance of the packing 1 is exerted, and hence the water-proof coupling as described in the section of Description of the Related Art is not needed. The coupling of the following structure can be used both for the typical type (exposed type) and the water-proof type (embedded type).

The coupling is constituted by the body 4 and the grip case 5 as illustrated in FIG. 2. The body 4 is formed so as to have a length and an inner diameter allowing the one end (terminal portion) P1 of the electric wire tube P to be inserted therein. The body 4 is provided with a slit-like aperture 41 over its entire length in parallel to an axis line. The body 4 is formed into a substantially tubular shape.

Further, the pair of grip portions 40 are formed by being bent from the edge-portions on the both sides of the aperture 41 to the outer peripheral side so as to have a substantially U-shaped cross-section. The grip portions 40 are provided along the axis line of the body 4 over the entire length of the body 4. The both end portions of the grip portions 40 are provided with cutouts 42 so as to be reduced in width toward ends, respectively.

The body 4 is provided with two lock pins 43 in a circumferential direction so as to be opposed to each other. In this example, four pairs of lock pins are fixed at a required interval in an axial direction with respect to each other.

Figure 5:
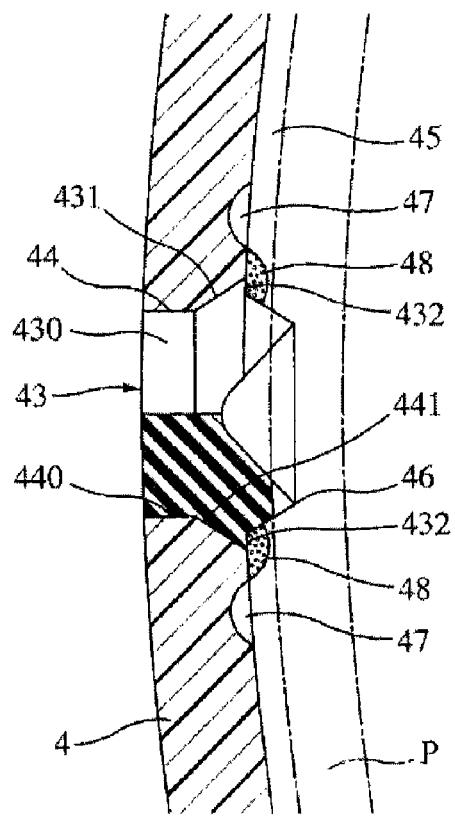
FIG. 5 is a cross-sectional view of main parts of a metal body, which is taken along the arrow A-A of FIG. 2.

Therefore, as illustrated in FIG. 5 in detail, the body 4 is provided with mounting holes 44 passing through the body 4 in a radial direction. Each of the mounting holes 44 includes: an equal-diameter hole portion 440 on the outer peripheral side of the body; and a conical hole portion 441 continuous with the equal-diameter hole portion 440 on an inner peripheral side of the body.

The conical hole portion 441 increases in diameter toward an inner peripheral surface 45 of the body 4 and is opened to the inner peripheral surface 45.

The lock pin 43 includes: a cylindrical portion 430 having such diameter and axial length that the lock pin 43 is fit into the equal-diameter hole portion 440 without space; and a portion continuous with the cylindrical portion 430, which has such shape and size that the lock pin 43 is fit into the conical hole portion 441 without space so as to be supported.

In addition, there are subsequently formed a circular-truncated-cone-like portion 431 and a cutting-edge-portion 46 while extending from the outer peripheral side toward the inner peripheral side of the body. The circular-truncated-cone-like portion 431 increases in diameter toward the inner peripheral surface 45 of the body. The cutting-edge-portion 46 is continuous with a large-diameter end of the circular-truncated-cone-like portion 431 through intermediation of a stage 432 and has a smaller outer diameter than a diameter of the large-diameter end.

The cutting-edge-portion 46 is formed into a tapered circular truncated cone shape. The cutting-edge-portion 46 is conically dented from a tip end surface thereof. Further, the cylindrical portion 430 of the lock pin 43 is fit into the equal-diameter hole portion 440 of the mounting hole 44 provided in the body. Then, the circular-truncated-cone-like portion 431 of the lock pin 43 is fit into the conical hole portion 441 of the mounting hole 44 from the inner peripheral side of the body so as to be supported. Then, the stage 432 of the lock pin 43 is arranged substantially flush with the inner peripheral surface 45 of the body 4. Then, the cutting-edge-portion 46 of the lock pin 43 is provided so that the cutting-edge-portion 46 is arranged so as to be slightly protrude from the inner peripheral surface 45 of the body 4 in the radial direction of the body 4.

The body 4 is not subjected to quenching and is formed of a material easy to be elastically deformed. Therefore, when a portion, which is on both sides in an axial direction of the body 4 of the mounting hole 44 and is in vicinity of the mounting hole 44, is punched, the inner peripheral surface 45 of the body 4 is plastically deformed, and hence a recessed portion 47 is formed. At the same time, a periphery around the recessed portion 47 is raised, and hence an engaging portion 48 is formed. The engaging portion 48 engages the stage 432 of the lock pin 43 from the inner peripheral side, and the circular-truncated-cone-like portion 431 of the lock pin 43 is pressed against a peripheral wall of the conical hole portion 441 of the mounting hole 44.

Therefore, the circular-truncated-cone-like portion 431 is sandwiched between the engaging portion 48 and the peripheral wall of the conical hole portion 441 so as to be fixed, and hence the lock pin 43 is securely fixed to the body 4 so as not to be detached.

Note that, it is preferred that the following is performed in order to fix the lock pin to the body. Specifically, the mounting hole 44 is formed in the body 4 before a flat metal plate constituting the body 4 is bent. Then, the cylindrical portion 430 and the circular-truncated-cone-like portion 431 of the lock pin 43 are fitted into the mounting hole. After that, the body is formed by bending the metal plate material. Still after that, punching is performed as described above.

Further, the lock pin 43 is formed of a quenched steel material, and the body 4 is not subjected to quenching so as to be capable of elastically deforming as described above.

The grip case 5 is, as illustrated in FIG. 2, formed to have the same length as the body 4 and a smaller width than a width of the body 4. Both-side edge-portions 50 and 50 of the grip case 5 are bent into a U-shape so as to be opposed to each other. The entire of grip case 5 is formed so as to have a cross-section curved into a raised-arc shape. Further, the grip case 5 slides in a longitudinal direction and causes the width of the aperture 41 to be narrowed while sandwiching the body 4. In this manner, the grip case 5 is engaged with and covers the grip portions 40.

Next, a grip case 5A as a modification of the grip case 5 is described with reference to FIG. 6.

The grip case 5A is different from the above-mentioned grip case 5 in that a width W1 between the both-sides edge-portions 50 and 50 is slightly larger than a width W2 and a space between the both-sides edge-portions 50 and 50 are tapered.

There is no guarantee that an outer diameter of the terminal portion P1 of the electric wire tube P is accurate outer diameter dimension, and there may be some error in the outer diameter.

Figure 6:
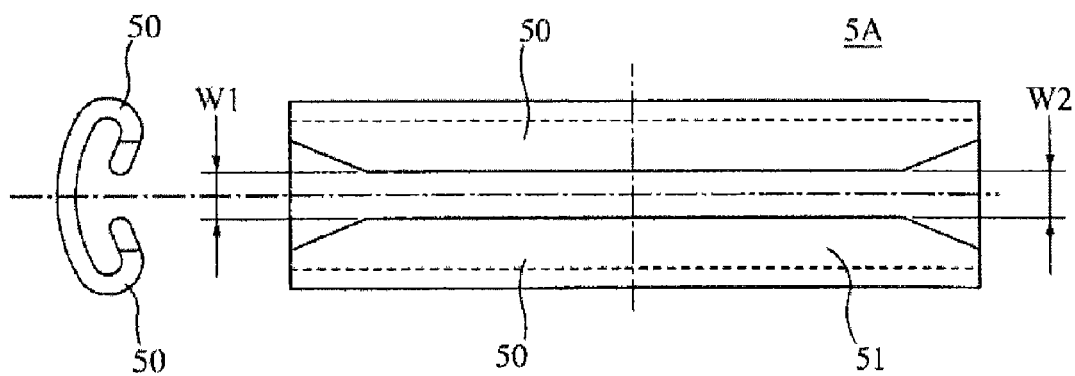
FIG. 6 is a view of a modification of a grip case.

Also in this case, it is sufficient that an electric wire tube P having a small outer diameter of the terminal portion P1 of the electric wire tube P is engaged by a region 51 of the grip case 5A of FIG. 6 so as to fix the electric wire tube P.

Lastly, a usage method of the packing 1, the body 4, and the grip case 5 is described with reference to FIG. 2 as follows:
(a) the packing 1 is fit into the body 4;
(b) the aperture 41 of the body 4 is widened with a driver or the like, and one of the electric wire tubes P is inserted into the body 4, and the outer peripheral surface 20 of the main body 2 of the packing 1 is slid below the aperture 41;

(c) another electric wire tube P is inserted into the body 4 from the opposite side in the same manner as described above; and the outer peripheral surface 20 of the main body 2 of the packing 1 of another electric wire tube P is slid below the aperture 41; and (d) the grip case 5 is hit with a hammer until the grip case 5 and the body 4 is completely overlap in the longitudinal direction.

What is claimed is:

1. A packing comprising:
    a main body inserted into tubular members through an inner-diameter-opening of each of respective ends of the tubular members; and
    an elastic portion which is situated substantially at a center of the main body, and against which each of the respective ends of the tubular members is abutted, wherein:
    the main body comprises:
        outer peripheral surfaces coming into contact with inner diameter surfaces of the tubular members, respectively;
        tapered surfaces tapered toward tip ends of the outer peripheral surfaces;
        recessed portions defined by steps forming the tapered surfaces and the outer peripheral surfaces; and
        a convex portion formed between the recessed portions and abutted against each end of the tubular members through the elastic portion; and
    the elastic portion comprises:
        an enclosing portion enclosing the convex portion of the main body; and
        extending portions which extend from the enclosing portion, and has tip ends fitting into the recessed portions of the main body, respectively.

2. A packing according to claim 1, wherein:
    the enclosing portion of the elastic portion is formed of a rigid material; and the extending portions of the elastic portion are formed of a soft material.

3. A screw less coupling connecting tubular members opposed to each other, which are joined through the packing according to claim 1, comprising:
    a tubular metal body provided with a slitted aperture extending over an entire length of the tubular metal body in parallel to an axis line thereof and provided with a pair of grip portions formed by bending edge-portions on both sides of the aperture to an outer peripheral side;
    a grip case engaged with the pair of grip portions so that a radius of the tubular metal body is reduced; and
    a plurality of lock pins protruding to an inner peripheral surface of the body so that a cutting-edge-portion of each of the plurality of lock pins, which is fit into a mounting hole passing through the body to both sides thereof in a radial direction, bite in an outer periphery of each of the tubular members, wherein:
    the mounting hole comprises:
        an equal-diameter hole portion; and
        a conical hole portion, which is continuous with a side of an inner periphery of the equal-diameter hole portion and increases in diameter toward an inner peripheral surface of the body;
    each of the plurality of lock pins comprises:
        a cylindrical portion fitting into the equal-diameter hole portion; and
        a truncated cone portion which is continuous with the cylindrical portion, being fit into the conical hole portion, and increasing in diameter toward a side of the inner periphery of the body;
    the truncated cone portion being continuous with each of the cutting-edge-portions through intermediation of a stage provided to a large-diameter end of the truncated cone portion; and
    the stage of each of the plurality of lock pins being engaged with an engaging portion formed by being raised from the inner peripheral portion of the body by punching while the cylindrical portion and the truncated cone portion of each of the plurality of lock pins are fit into the equal-diameter hole portion and the conical hole portion of the mounting hole, respectively, to thereby fix each of the plurality of lock pins to the body.

* * * * *